M. R. MATTI.
VALVE REGULATOR FOR OIL ENGINES.
APPLICATION FILED APR. 25, 1912.
1,101,652.
Patented June 30, 1914.
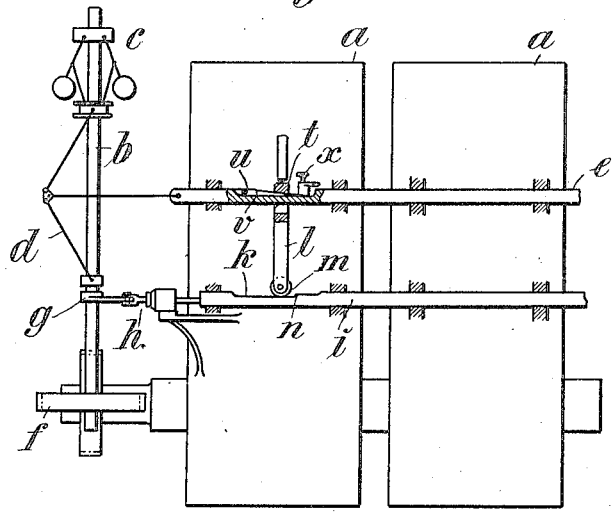
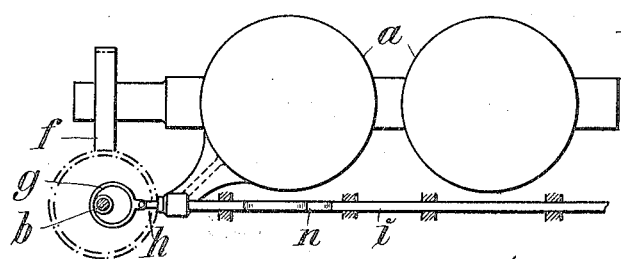
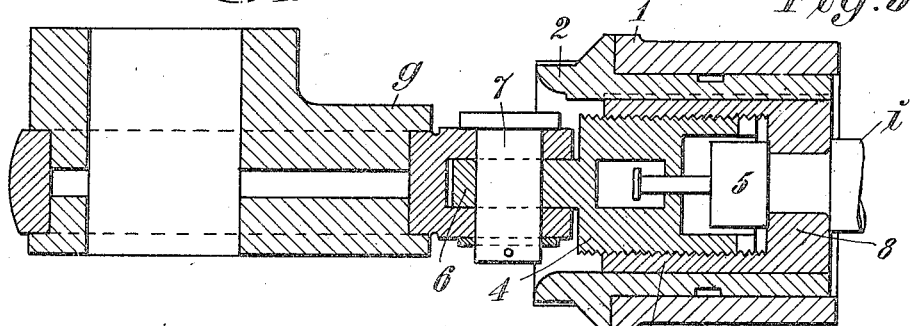
WITNESSES:
F. G. Campbell
Ira P. Ames
INVENTOR
Max Richard Matti
BY
Connolly Bros
ATTORNEYS

UNITED STATES PATENT OFFICE.

MAX RICHARD MATTI, OF FALUN, SWEDEN.

VALVE-REGULATOR FOR OIL-ENGINES.

1,101,652.

Specification of Letters Patent.

Patented June 30, 1914.

Original application filed September 14, 1910, Serial No. 581,975. Divided and this application filed April 25, 1912. Serial No. 693,172.

*To all whom it may concern:*

Be it known that I, MAX RICHARD MATTI, a subject of the King of Sweden, residing at Falun, in the Kingdom of Sweden, have invented certain new and useful Improvements in Valve-Regulators for Oil-Engines, of which the following is a specification.

My present invention relates to gas or oil engines of the kind where the cam surface or surfaces actuating the pump or air valves are arranged on reciprocating bars.

This application is a division of my application Serial No. 581,975, filed by me, upon which Patent No. 1,074,000 dated September 23d, 1913, has been granted.

The invention has for its object to make it possible to regulate the said cam carrying organ during the run of the engine in such a way that the situation of the moving path of the cam or cams can be changed without changing the length of said moving path. By this the moment of introduction of the air or the oil or both into the cylinders can be changed during the run of the engine.

The invention consists therein that between the cam carrying organs and the driving means driving same there are inserted rotatable adjusting means. By rotating same the distance between the cam carrying organ and the driving means can be changed. The said rotatable means for this purpose suitably consist of a shell slidingly and turnably connected with the one part and rotatably connected with the other part.

The invention is shown on the annexed drawing.

Figure 1 shows from the side and Fig. 2 in plan the arrangement in connection with a machine with two cylinders. Fig. 3 is a detailed view on a greater scale of one embodiment of the invention.

In Figs. 1 and 2 the governor shaft $b$ of the engine $a$ is driven from the engine shaft by means of a screw transmission $f$ or in any other suitable way. The governor $c$ acts by means of the levers $d$ upon the regulating shaft $e$, which is movably arranged in the direction of its length. On the shaft $b$ there is arranged an eccentric $g$, working on the reciprocating bar $i$ by means of the rod $h$, said bar $i$ being parallel to the shaft $e$. The bar is provided with a cam surface $k$, against which the rod $l$ abuts by means of the roll $m$. On the reciprocating movement of the bar $i$ the rod $l$ will of course receive a reciprocating motion in the direction of its length. The rod $l$ is adapted to be connected with the oil pump or the admission or exhaust valve for the air or the oil for the purpose of actuating the same when moving. It is clear that the cam surface $k$ can be arranged on the bar $l$ and the roll $m$ on the bar $i$.

In order that it may be possible to adjust the cam surface $k$, $n$ during the run of the machine, thereby regulating the motion of the rod $l$ and the valve connected with it, the bar $i$ is connected with the eccentric in such a way as to make it possible to adjust the distance between $g$ and $i$ during the run of the motor. According to the embodiment shown in Fig. 3 this is performed by the following device: $i$ is the cam carrying bar, driven from the eccentric $g$. 1 is a fixed part, wherein the shell 2 is turnably but not slidingly arranged. Said shell 2 embraces another shell 3 in such a way that upon turning of shell 2 the shell 3 is also turned, whereby, however, the latter one can slide in the former one in the direction of its length. This suitably is performed by providing one of the shells with longitudinal grooves, wherein projections from the other shell project. The shell 3 is provided with a flange 8, which is turnably but not slidingly connected with the bar $i$. This is performed by the bar $i$ being provided at its end with a head 5, for instance a nut, which together with a flange on the bar $i$ embraces the said flange 8. The shell 3 has the shape of a nut and is threaded on its inner surface. It embraces the screw threaded bolt 4, which is provided with an ear 6, connected to the eccentric $g$ by means of a pin 7.

The device is adjusted in the following way: During the rotation of the eccentric the parts 7, 6, 4, 3, 8, 5 and $i$ will receive a reciprocating motion. When the shell 2 is turned, the shell 3 will also be turned and on account of the screw meshing of the parts 3 and 4 the said parts, whereof 4 can not turn, will change their axial relative position, whereby the distance between the pin 7 and the bar $i$ will also be changed.

It is, further, possible to modify the construction by making only the cams but not the carrying bars adjustable. Cams can be substituted for the eccentric $g$.

In order that it may be possible to regulate the quantity of the oil and not only the movement of introduction of the air of the oil, the rod $l$ in Figs. 1 and 2, connected with the oil pump, is provided with a projection $t$, coöperating with the inclined surface $u$ of the shaft $e$. When this shaft is moved by the action of the governor $c$, the rod $l$ will abut against the said inclined surface $u$ at an earlier or later moment, depending upon the position of the said shaft $e$. Hereby the motion of the said rod $l$ will be varied in correspondence to the varying position of the shaft $e$ and thereby the quantity of oil introduced in the cylinder, will be varied. In order that it may be possible to regulate the action of the inclined surface by hand, the said surface $u$ is arranged on a key $v$, being movable on the shaft $e$. $x$ is a screw, by means of which the position of the key $v$ can be secured when adjusted.

Having now fully described my invention, what I claim and desire to protect by Letters Patent is:—

1. In oil engines, in combination, a longitudinally adjustable member having a reciprocating motion, and composed of two relatively adjustable sections and means for adjusting the sections rotatively to each other during the run of the engine, said means including a rotatable and longitudinally immovable adjusting part.

2. In oil engines, in combination, a longitudinally adjustable member having a reciprocating motion, and adjusting means for said member including a rotatable longitudinally immovable part.

3. In oil engines, in combination, a telescopic member having a reciprocating motion and means for adjusting the length of said member during the run of the engine, said means consisting of a rotatable, longitudinally, movable adjusting part and a rotatable, longitudinally immovable part for rotating said longitudinally movable part.

4. In oil engines, in combination, a longitudinally, reciprocating member made in two relatively adjustable sections, a shell having a flange embracing one of said sections and having threads or inclined grooves coöperating with threads or inclined grooves on a bolt, carried by the other of said sections, a rotatable, longitudinally immovable shell engaging the first named shell.

5. In oil engines, in combination, a member having a reciprocating motion and formed in two sections, a shell having a flange embracing one of said sections and having threads or inclined grooves coöperating with threads or inclined grooves on the other section, and a second shell engaging the first named shell and turnably arranged in a fixed part.

In testimony whereof I have affixed my signature in presence of two witnesses.

MAX RICHARD MATTI.

Witnesses:
  C. HAMMAR,
  E. M. LUNDSTROM.